(12) United States Patent
Misra et al.

(10) Patent No.: US 9,137,282 B2
(45) Date of Patent: Sep. 15, 2015

(54) OPTIMIZING EVALUATION PATTERNS AND DATA ACQUISITION FOR STREAM ANALYTICS IN RESOURCE-CONSTRAINED WIRELESS ENVIRONMENTS

(71) Applicant: Telcordia Technologies, Inc., Piscataway, NJ (US)

(72) Inventors: Archan Misra, Bridgewater, NJ (US); Benjamin Falchuk, Upper Nyack, NY (US); Atanu Roy Chowdhury, Kolkata (IN)

(73) Assignee: Telcordia Technologies, Inc., Piscataway, NJ (US)

( * ) Notice: Subject to any disclaimer, the term of this patent is extended or adjusted under 35 U.S.C. 154(b) by 0 days.

(21) Appl. No.: 14/081,308

(22) Filed: Nov. 15, 2013

(65) Prior Publication Data

US 2014/0074982 A1 Mar. 13, 2014

Related U.S. Application Data

(63) Continuation of application No. 12/827,118, filed on Jun. 30, 2010, now Pat. No. 8,615,597.

(51) Int. Cl.
| | |
|---|---|
| *G06F 15/16* | (2006.01) |
| *H04L 29/06* | (2006.01) |
| *H04N 21/45* | (2011.01) |
| *H04W 52/02* | (2009.01) |
| *H04W 28/06* | (2009.01) |
| *H04W 72/12* | (2009.01) |

(52) U.S. Cl.
CPC ............ *H04L 65/60* (2013.01); *H04N 21/4516* (2013.01); *H04W 52/0219* (2013.01); *H04W 28/06* (2013.01); *H04W 72/12* (2013.01)

(58) Field of Classification Search
None
See application file for complete search history.

(56) References Cited

U.S. PATENT DOCUMENTS

| | | | |
|---|---|---|---|
| 6,725,287 B1 | 4/2004 | Loeb et al. | |
| 6,826,607 B1 | 11/2004 | Gelvin et al. | |
| 7,496,477 B2 | 2/2009 | Misra et al. | |
| 7,719,416 B2* | 5/2010 | Arms et al. | ................ 340/539.1 |
| 7,865,887 B2 | 1/2011 | Kaiser et al. | |
| 8,069,190 B2 | 11/2011 | McColl et al. | |

(Continued)

OTHER PUBLICATIONS

Deshpande, A., et al., "Model-Driven Data Acquisition in Sensor Networks", Proceedings of the 30th VLDB Conference, Toronto, Canada, 2004.

(Continued)

*Primary Examiner* — Thomas Dailey

(57) ABSTRACT

Mobile wireless devices may receive data streams from multiple remote sensors. The sensors may have limited power supplies and memory capacity. Aspects of the invention use statistical characteristics of the sensor data streams and the cost of acquiring a single element of each stream to determine what sequence the sensors should send their data streams in. The cost of acquiring the data may be modified dynamically, depending on parameters such as block size. Additional factors, such as a sensor's buffer capacity, may limit the amount of stream elements that may be cached and affect the sensors' stream transmit sequence. The evaluation order may be dynamically modified using an event processing engine, to reflect both changing statistics of underlying sensor stream tuples and time-varying acquisition costs associated with individual streams. This helps to increase in the operational lifetime of the sensors and associated monitoring applications.

18 Claims, 7 Drawing Sheets

(56) References Cited

U.S. PATENT DOCUMENTS

| | | |
|---|---|---|
| 2007/0136254 A1 | 6/2007 | Choi et al. |
| 2008/0056291 A1 | 3/2008 | Liu et al. |
| 2008/0082628 A1 | 4/2008 | Rowstron et al. |
| 2008/0239951 A1 | 10/2008 | Strom |
| 2008/0256167 A1 | 10/2008 | Branson et al. |
| 2008/0256384 A1 | 10/2008 | Branson et al. |
| 2008/0288441 A1 | 11/2008 | Lee et al. |
| 2009/0058634 A1 | 3/2009 | Maltseff et al. |
| 2009/0144011 A1* | 6/2009 | Kumar Nath ................. 702/116 |
| 2009/0157877 A1 | 6/2009 | Baek et al. |
| 2011/0131588 A1 | 6/2011 | Allam et al. |

OTHER PUBLICATIONS

Jovanov, F, et al., "A Wireless Body Area Network of Intelligent Motion Sensors for Computer Assisted Physical Rehabilitation", Journal of NeuroEngineering and Rehabilitation, Mar. 1, 2005.

Khan, Q., et al. "Energy Harvesting for Self Powered Wearable Health Monitoring System", TechOnline, pp. 1-5, Apr. 9, 2009.

Srivastava, U., et al., "Memory-Limited Execution of Windowed Stream Joins", Proceedings of the 30th VLDB Conference, Toronto, Canada, 2004.

Liu, Y., et al., "Query Optimization for Distributed Data Streams", ISCA 15th International Conference on Software Engineering and Data Engineering (SEDE'06), Los Angeles, Jul. 2006.

* cited by examiner

500

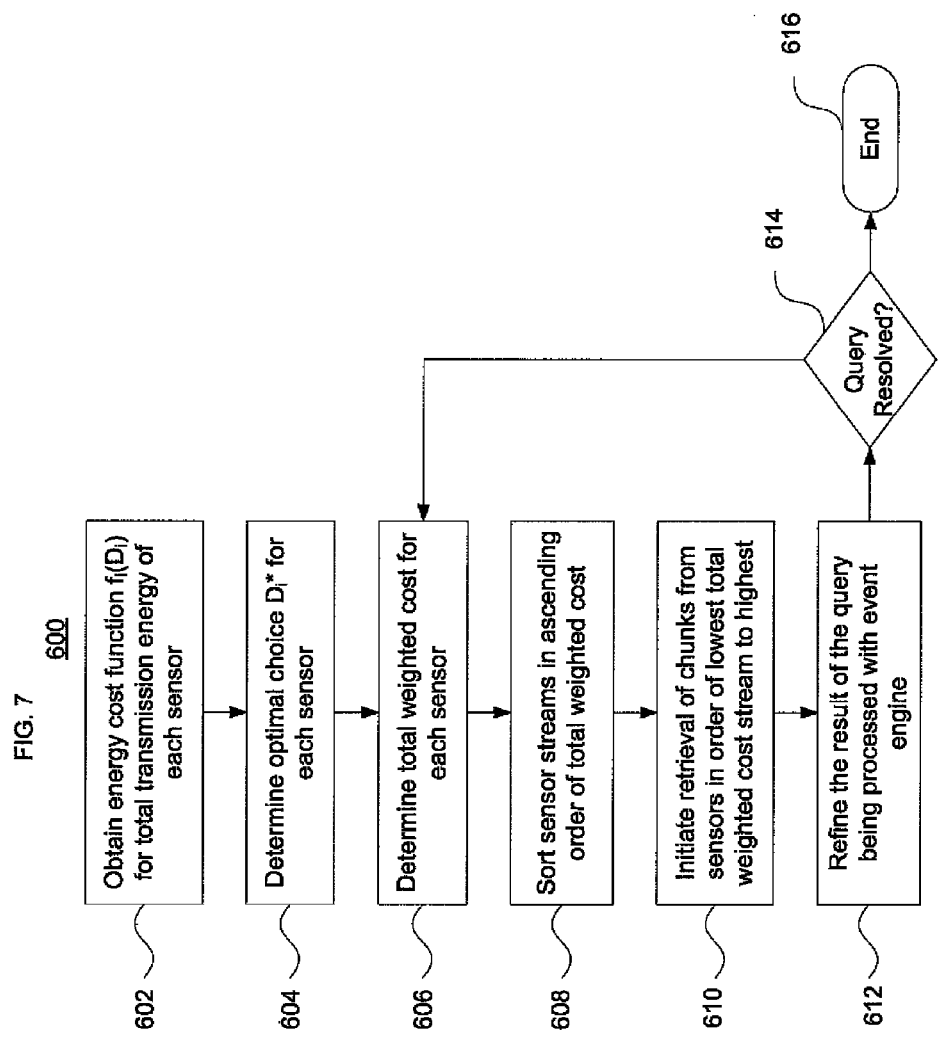

OPTIMIZING EVALUATION PATTERNS AND DATA ACQUISITION FOR STREAM ANALYTICS IN RESOURCE-CONSTRAINED WIRELESS ENVIRONMENTS

BACKGROUND OF THE INVENTION

1. Field of the Invention

The invention generally relates to event processing on resource-constrained devices, such as cellular telephones or other portable handheld devices, in wireless environments. More particularly, the invention relates to managing data streams for sensors communicating with mobile devices to promote power conservation and system efficiency. This application is a continuation of U.S. patent application Ser. No. 12/827,118, filed Jun. 30, 2010, now U.S. Pat. No. 8,615,597.

2. Description of Related Art

Over the years, portable client devices have evolved from basic portable telephones and pagers to multi-function wireless 3G or 4G machines. Different applications can leverage the varied resources of a given client device, including embedded or remote sensors, to provide a robust platform that may, for instance, enable user heart rate analysis or other monitoring functions.

Many applications of sensor networks involve on-line (near real-time) analysis of multiple sensor-generated event streams of data provided to a client device. Often, stream analysis is performed using high-end server platforms, where energy efficiency of the computing process is not a significant concern as servers can be easily scaled "up" and/or "out". Moreover, known solutions are frequently geared towards infrastructure (e.g., analysis of stock feeds from Web sites or financial transactions) where the data stream sources have no significant energy bottlenecks, the communication link between the data source and the analysis engine has sufficient bandwidth, the sources simply "push" the data out to the computing engine, and the cost of pushing the data is often assumed to be minimal.

In the past, there have been various attempts at stream query optimization. For instance, queries can be formulated as a collection of database-oriented operators such as sliding-window joins, projections and selections occurring over sequences of "tuples," where each tuple sequence is an independent stream. For processing of stream-oriented data, such queries are often represented as an operator graph, with the output of upstream query operators becoming the input to a downstream query operator. A number of optimization approaches focus on reordering the sequence in which the operators are applied on incoming data tuples or changing the locations at which different operators are applied, for either reducing the processing computational load or increasing the processing throughput. Such schemes may perform more selective operations (those that eliminate a greater fraction of the non-relevant incoming data tuples) first, before applying less selective operations. Likewise, page-oriented processing techniques for database query processing focus on evaluating groups of tuples arriving as a batch, rather than processing each tuple individually. However, these schemes do not consider variable costs and constraints associated with the acquisition of these data tuples, nor do they use these costs and constraints as inputs to the process of rearranging the sequence of data acquisition and evaluation.

One known approach to the problem of stream processing in sensor networks involves the use of a statistical model to capture the contribution of an individual sensor's data to resolve the query predicate (criterion evaluation). This approach then uses the model to determine the sequential order in which tuples from different sensor streams are evaluated. However, this approach may only focus on snapshot (or one-off) queries, where the data elements for each instance of the query must be explicitly acquired through a polling process, and thus does not consider any temporal statistics of an individual stream.

However, such applications employing known methods for stream processing on mobile devices may result in unacceptably high communication-related energy overheads, and may thus result in limited operational lifetimes of both the sensors transmitting the data streams and the mobile devices themselves.

SUMMARY OF THE INVENTION

According to one embodiment of the invention, a method of managing data streams from sensor devices received by a mobile client device is provided. The method comprises identifying a plurality of data streams each corresponding to a respective sensor device, each of the plurality of data streams being receivable by the mobile client device; specifying an order for which each of the plurality of data streams is to be acquired or processed by an event processing module of the client device; using the specified order to receive the plurality of data streams; determining, by the event processing module, at least a partial result of a query predicate using data from the received plurality of data streams; and the event processing module dynamically modifying some property of a process by which a selected set of the plurality of data streams transmit their data to the event proceeding module.

In one example, the dynamically modifying step includes dynamically modifying the order for acquiring or processing data from selected ones of the selected set of data streams based upon the partial result of the query predicate. In another example, the dynamically modifying step includes dynamically modifying a given property of the selected set of sensors. In one alternative, the given property is a sensor sampling or transmission rate. In another alternative, the given property is a chunk size in which the data is transmitted to the event processing module.

In a further example, specifying the order is based on an evaluation of a statistical distribution of values of chosen ones of the plurality of data streams and costs of acquiring data for the respective chosen data streams. In this case, the method may further comprise determining an order for minimizing a total cumulative data acquisition and evaluation cost. Alternatively, the method may further comprise determining an order for optimizing at least one additional performance metric based on a consideration of residual energy of a respective one of the sensor devices or the mobile client device. In this case, the at least one additional performance metric is desirably an operational lifetime of a query evaluation.

In a further alternative, the method may also comprise tracking any changes to the statistical distribution of the values of the chosen ones of the plurality of data streams; and using the statistical distribution to modify the order of stream acquisition and evaluation. Here, the method desirably further comprises using a determination of pre-specified contextual states to trigger the modification of the order of stream acquisition and evaluation.

In another example, receiving the plurality of data streams in the specified order includes the event processing module dynamically indicating a chunking size for the plurality of data streams; and instructing the sensor devices to transmit their respective data streams according to the indicated chunking size. In yet another example, the method further comprises determining a total weighted cost for each of the sensor devices to proactively transmit its data in predetermined data chunks, where weighting for the total weight cost is associated with a likelihood of individual tuples in a given data chunk being relevant to one or more queries processed by the event processing module and a communication cost involved in acquiring a given data chunk; sorting the total weighted costs for the respective data streams; and instructing the sensor devices to transmit their respective data streams according to the sorted total weight costs.

In another example, upon determining at least the partial result of the query predicate, the method further comprises instructing a first one of the sensor devices to delay transmission of its data stream. In this case, determining at least the partial result desirably includes determining whether a predicate for a second one of the sensor devices does not meet a specified criterion.

In yet another example, the method further comprises associating each of the plurality of data streams with a corresponding acquisition cost, the acquisition cost being a function of a size and rate of data generated by the respective sensor device; and setting an acquisition order for controlling transmissions of the plurality of data streams. And in another example, the method further comprises issuing an alert based upon determining the partial result of the query predicate.

In accordance with another embodiment of the invention, an apparatus for managing data streams from sensor devices received by a mobile client device is provided. The apparatus comprises memory for storing received data stream information from the sensor devices and processor means. The processor means is for identifying a plurality of data streams each corresponding to a respective sensor device, each of the plurality of data streams being receivable by the mobile client device; specifying an order for which each of the plurality of data streams is to be processed by an event processing module of the client device; receiving the plurality of data streams in the specified order; determining at least a partial result of a query predicate using data from the received plurality of data streams; and dynamically modifying some property of a process by which a selected set of the plurality of data streams transmit their data to the event proceeding module.

In one example, the dynamic modification includes dynamically modifying the order for acquiring or processing data from selected ones of the selected set of data streams based upon the partial result of the query predicate. In another example, the dynamic modification includes dynamically modifying a given property of the selected set of sensors. In a further example, the processor means comprises an event processing module including an event engine configured to apply event operator graphs to data tuples of the plurality of received data streams; and a dynamic query optimizer configured to compute an optimal order in which the data tuples from the plurality of sensor streams should be retrieved for evaluation by the event engine.

In one alternative, the event processing module further includes an application specification that specifies characteristics of an application, including operator logic and latency toleration. In another alternative, the event processing module further includes a set of optimization models used to capture and compute parameters for evaluation by the dynamic query optimizer. In a further alternative, the dynamic query optimizer is configured to instruct at least one of the sensor devices to delay transmission of its data stream.

In another example, the dynamic query optimizer is configured to associate each of the plurality of data streams with a corresponding acquisition cost and set an acquisition order for controlling transmissions of the plurality of data streams based on the acquisition costs. Here, the acquisition cost for a given one of the plurality of data streams may be a function of a size and rate of data generated by the sensor device configured to issue the given data stream.

In yet another example, the processor means is further operable to track any changes to the statistical distribution of the values of the chosen ones of the plurality of data streams, and use the statistical distribution to modify the order of stream acquisition and evaluation. Here, the processor means is desirably further operable to use a determination of pre-specified contextual states to trigger the modification of the order of stream acquisition and evaluation.

BRIEF DESCRIPTION OF THE DRAWINGS

FIG. 7 is a flow diagram for determine a data acquisition order and an amount of data to be acquired from sensors in accordance with aspects of the invention.

DETAILED DESCRIPTION

Figure 1:
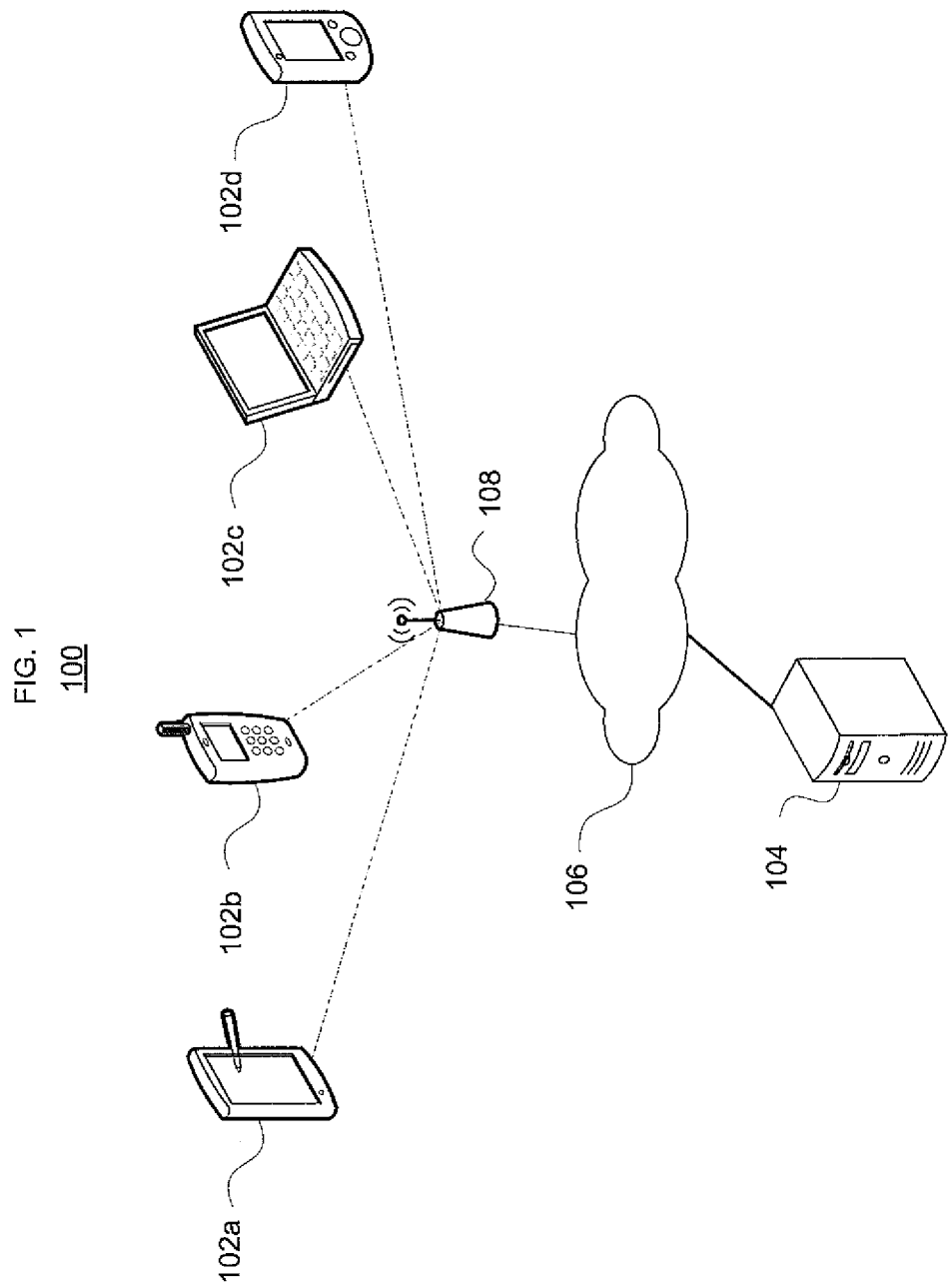
FIG. 1 illustrates a computer network for use with aspects of the invention.

Aspects, features and advantages of the invention will be appreciated when considered with reference to the following description of preferred embodiments and accompanying figures. The same reference numbers in different drawings may identify the same or similar elements. Furthermore, the following description is not limiting; the scope of the invention is defined by the appended claims and equivalents.

As will be described in detail below, aspects of the invention improve energy efficiency of pervasive event processing engines by dynamically altering the predicate evaluation order and data acquisition characteristics for continuous or regular queries associated with mobile or energy-constrained devices.

Aspects of the invention are used to improve the energy-efficiency of event stream processing in a pervasive setting, on both the resource-constrained pervasive device and the sensors generating the data streams. For instance, stream analysis may be performed by a processor on a resource-constrained platform (e.g., a mobile phone) and where the cost of data transfer between the data sources (e.g., a multitude of body-worn sensors) and the computing engine is non-negligible (e.g., involves the use of wireless links between body-worn sensors and the mobile phone).

Often, such sensors are employed in long-term nearly-continuous or continuous monitoring applications. Moreover, the applications often operate in near-real time, implying that the analytics result of processing the event streams should become available within a specified delay from the time of generation of the sensor data. The sensors may have small form factors and limited battery size, memory capacity and transmission capability. Management of the sensors is desirably performed in order to permit extended use of such devices. As indicated above, sensors may transmit streams or tuples of data. Due to the sensors' resource constraints, it is important to manage how and when data is provided by the sensors to a client device such as a mobile phone.

One aspect of the invention adjusts the order in which elements, or groups of elements, from individual streams are evaluated to detect a higher-layer event (which may be expressed as a composite predicate based on selected criteria) to minimize the cost of both acquiring and processing the individual data stream elements. Dynamically adjusting the order of evaluation enables detection of higher-layer events often by only partially acquiring or evaluating the underlying data. One important aspect is that the process of event acquisition and processing is terminated whenever it is determined that additional data stream elements will not affect the output event generated by the analytics. This reduces both communication and computational overheads on the sensor side and the mobile device side. The evaluation order (and the data acquisition process) is desirably adapted dynamically, based on the statistics of the event values, the selectivity properties of the individual operator predicates, and the cost of acquiring the events. Thus, in some cases, selected sensors are instructed to buffer data for a certain period of time so that other sensors may transmit their data first. In another case, the data from one sensor may not be needed if the predicate evaluation on data for another sensor does not meet specified criteria, thereby abrogating the needed for additional query evaluation.

Managing the streams and the evaluation order provides substantial practical value in many resource-constrained remote monitoring applications, such as remote health monitoring (e.g., where a cellular phone may be used to perform event processing on biomedical data streams from body-worn sensors) and environmental monitoring (e.g., where a resource-limited sensor gateway is used to analyze data transmitted over a wireless sensor network by battery-operated sensors). Reducing the computational and communication overheads in such pervasive event processing architectures results in extending the operational lifetime of the equipment in such pervasive monitoring scenarios.

FIG. 1 illustrates an exemplary system for use with aspects of the invention. This illustration presents a schematic diagram of a computer system depicting various wireless computing devices that can be used alone or in a networked configuration. For example, this figure illustrates a computer network 100 having a plurality of wireless client devices 102a-d, coupled to a server such as an application server 104 via communications network 106 and wireless access point 108. The application server 104 may provide or support one or more monitoring applications. The communications network 106 may be a local area network ("LAN") such as a WiFi network, a wide area network ("WAN"), the Internet, etc. While not shown, the communications network 106 may include a plurality of nodes having routers, servers, etc.

Figure 2:
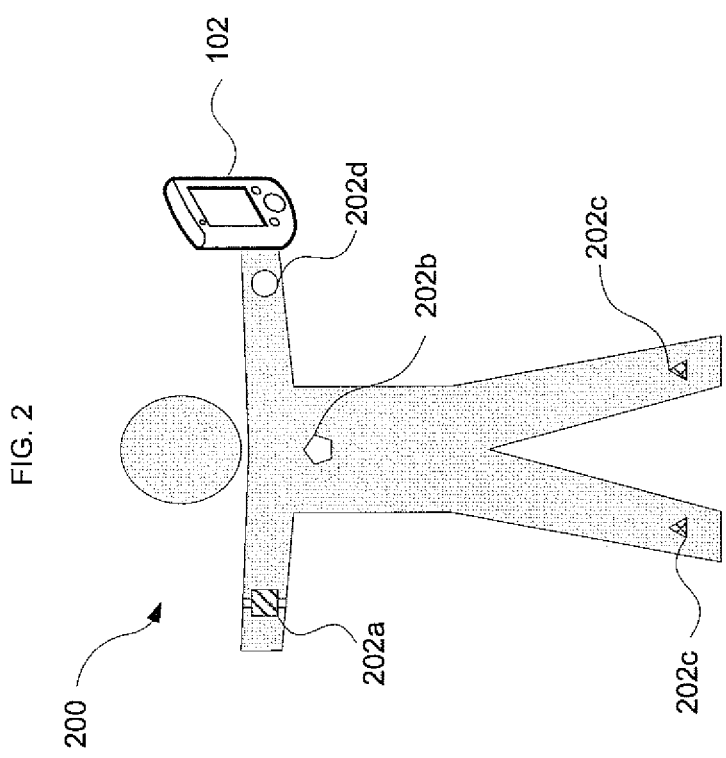
FIG. 2 illustrates a client device and sensors for use with aspects of the invention.

As shown, different types of client devices may be used, including a tablet device 102a, a mobile phone 102b, laptop or palmtop computer 102c and a multimedia (e.g., PDA) type device 102d. Each client device 102 may be used in conjunction with one or more other devices, including sensors that may be worn on or implanted in a user. This may be done as part of a personal area network ("PAN") or body area network ("BAN"). FIG. 2 illustrates a user 200 who has a client device such as multimedia device 102d. By way of example only, the user may have different sensors 202 such as a GPS-enabled device 202a, an electrocardiography (ECG or EKG) device 202b, motion sensors 202c, an oxygen saturation ($S_{O2}$) sensor 202d, etc. Other types of sensors may perform different functions such as monitoring muscle activity (e.g., an electromyography sensor), monitoring brain electrical activity (e.g., an electroencephalography sensor), a tilt sensor, a perspiration sensor, etc. In addition, such sensors may perform multiple functions in one unit. The client device may also provide certain sensor-type functions using, for instance, an accelerometer, compass and/or GPS receiver.

Each of the sensors may communicate with the mobile client device, such as the multimedia device 102d, via wired or wireless communication. For instance, Bluetooth or other short-range communications protocols, such as IEEE 802.15.4, may be employed for local communication with the client device. The communication may be one-way (i.e., the sensor is only capable of transmitting to the client device) or two-way (i.e., the sensor includes transmit and receive capabilities, e.g., via an RF transceiver). In turn, the client device may communicate with the server 104 via a wireless LAN, cellular or PCS communication network or other communication architecture.

Figure 3:
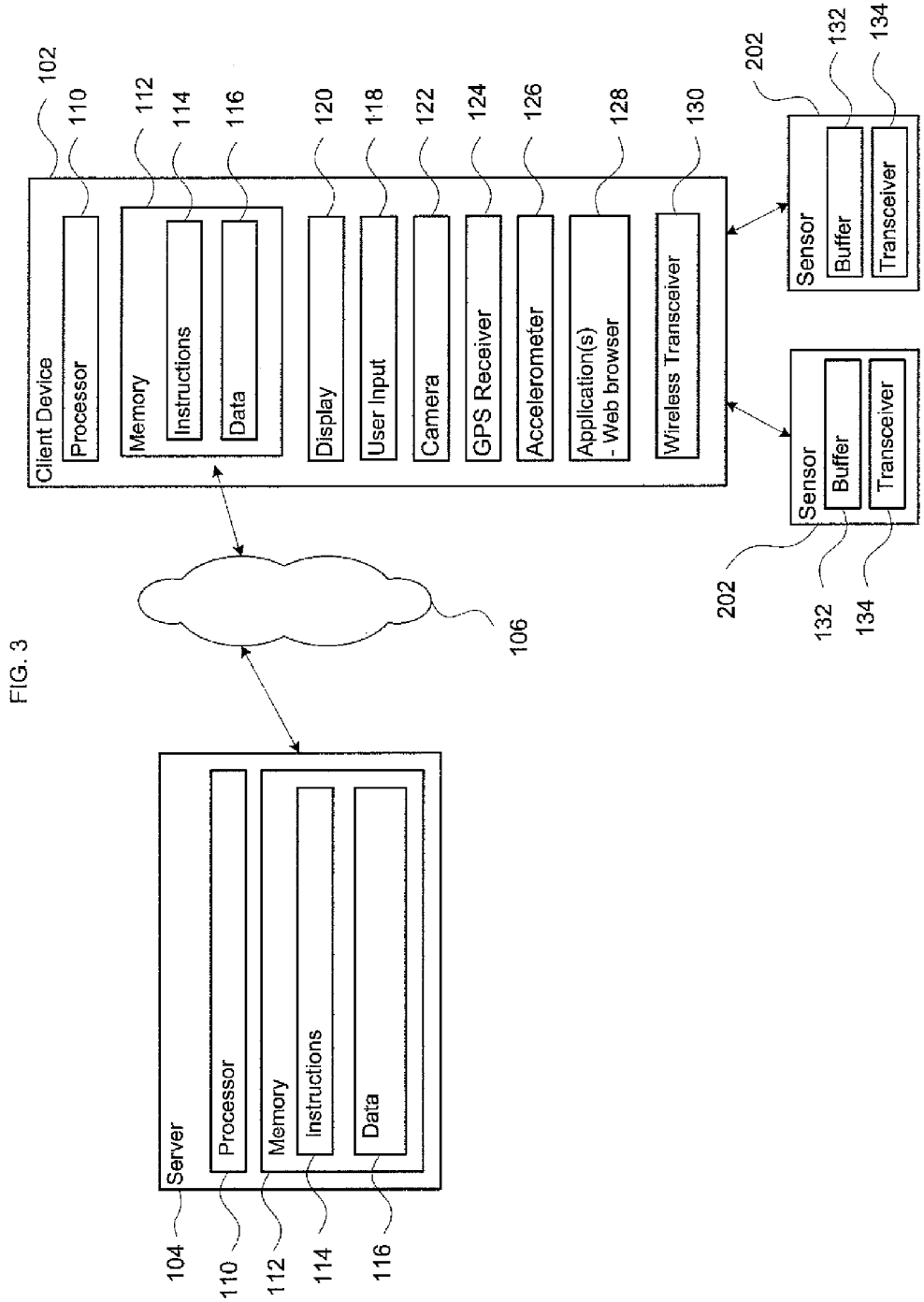
FIG. 3 illustrates features of the computer network of FIG. 1.

As shown in the simplified configuration of FIG. 3, the server 104 and client device(s) 102 may each include a processor 110 and memory 112 for storing instructions 114 and data 116. The server 104 and client 102 may also contain other components typically present in a computer. By way of example only, client device 102 may include a user input 118 such as a keyboard, mouse and/or various other types of input devices such as pen inputs, joysticks, buttons, etc., as well as a display 120, which could include, for instance, an LCD or touch screen. Depending on the type of client device 102, it may also include a camera 122, GPS receiver 124, accelerometer 126 and wireless transceiver (not shown). The client device may be configured to run applications 128 such as a web browser. The client device 102 desirably also includes at least one wireless transceiver 130 for communicating with a wireless network and/or with the sensors 202. Correspondingly, the sensors 202 may also include wireless a transceiver 132. Alternatively, some or all of the sensors 202 may have wired connections to the client device 102. As shown, the sensors 202 also include a data buffer 134 for storage of data collected by the respective sensors.

Memory 112 stores information accessible by processor 110, including the instructions 114 that may be executed by the processor 110 and the data 116 that may be retrieved, manipulated or stored by the processor. The memory may be of any type of computer-readable storage medium for storing information accessible by the processor, such as a hard-drive, flash memory, ROM, RAM, optical disk, etc. The processor 110 may comprise any number of well known processors, such as processors from Intel Corporation or Advanced Micro Devices. Alternatively, the processor may be a dedicated controller for executing operations, such as an ASIC or PIC, or may be implemented as an FPGA.

The instructions 114 may comprise any set of instructions to be executed directly (such as machine code) or indirectly (such as scripts) by the processor. In that regard, the terms "instructions," "steps" and "programs" may be used interchangeably herein. The instructions may be maintained in any computer language or format, such as in object code or modules of source code, and may be recorded on any of the computer-readable storage media discussed herein. The functions and methods of operation in accordance with aspects of the invention are explained in more detail below.

Data 116 may be retrieved, stored or modified by processor 110 in accordance with the instructions 114. The data may be stored as a collection of data. For instance, although the invention is not limited by any particular data structure, the data may be stored in computer registers, in a relational database as a table having a plurality of different fields and records, XML documents, etc.

The data may also be formatted in any computer readable format. Moreover, the data may include any information sufficient to identify the relevant information, such as descriptive text, proprietary codes, pointers, references to data stored in other memories (including other network locations) or information which is used by a function to calculate the relevant data.

Although the processors 110 and memories 112 of the server 104 and the client device 102 are functionally illustrated in FIG. 3 as being within the same blocks, it will be understood that the processors and memories may actually comprise multiple processors and memories that may or may not be stored within the same physical housing or location. For example, some or all of the instructions and data may be stored on a removable recording medium such. Alternatively, such information may be stored within a read-only computer chip. Some or all of the instructions and data may be stored in a location physically remote from, yet still accessible by, the processor. Similarly, the processor may actually comprise a collection of processors which may or may not operate in parallel. Depending upon the system configuration and requirements, data may be distributed and stored across multiple memories 112 such as hard drives, data centers, server farms or the like.

As noted above, the server 104 and client devices 102 are capable of direct and indirect communication with one another, such as over network 106. Although only a few devices are depicted in FIGS. 1 and 3, it should be appreciated that a typical system can include a large number of connected servers and clients, with different devices being at different nodes of the network. The network 106, including any intervening nodes, may comprise various configurations and protocols including the Internet, intranets, virtual private networks, wide area networks, local networks, private networks using communication protocols proprietary to one or more companies, Ethernet, WiFi, Bluetooth and HTTP.

Communication across the network, including any intervening nodes, may be facilitated by any device capable of transmitting data to and from other computers, such as wireless transceivers, routers and network interfaces. Server 102 may be a web server or other application server.

One important feature of the present invention lies in the ability of the client device to dynamically alter the order in which it accesses data elements from individual streams received from different sensors and applies evaluation operators to such data elements. This dynamic adaptation utilizes both changes in the statistics of the data elements of each sensor data stream and the acquisition cost associated with each stream. It has been discovered that significantly lower computation complexity and communication overhead may be realized if one alters the current process by which each sensor "streams" or "pushes" its data to the client device, even though in many cases a higher layer event could have been detected without actually utilizing large portions of such streamed data. This observation leads to aspects of the invention with an architecture where an event engine of the client device may acquire individual data elements from a specific data stream on demand. The event engine may comprise the client device's processor operating an application or set of instructions. The event engine desirably receives and parses streamed data from sensors and implements the analytics logic (i.e., processes the query operator predicates) to generate the output events. As mentioned above, the query is often implemented as graph of stream-oriented operators. In this case, the event engine is responsible for applying this operator graph over the incoming stream data. Examples of current commercial event engines for pervasive devices include IBM DB2 Everyplace, IBM solidDB, and Oracle Database Lite. Moreover, significantly higher efficiency in the data transfer process may be achieved by transmitting data from the sensors in "chunks" (blocks) rather than continuously. This enables the sensor's transmitter to achieve a low-duty cycle and amortize the startup cost incurred in data transmissions over a larger chunk of data.

Figure 4:
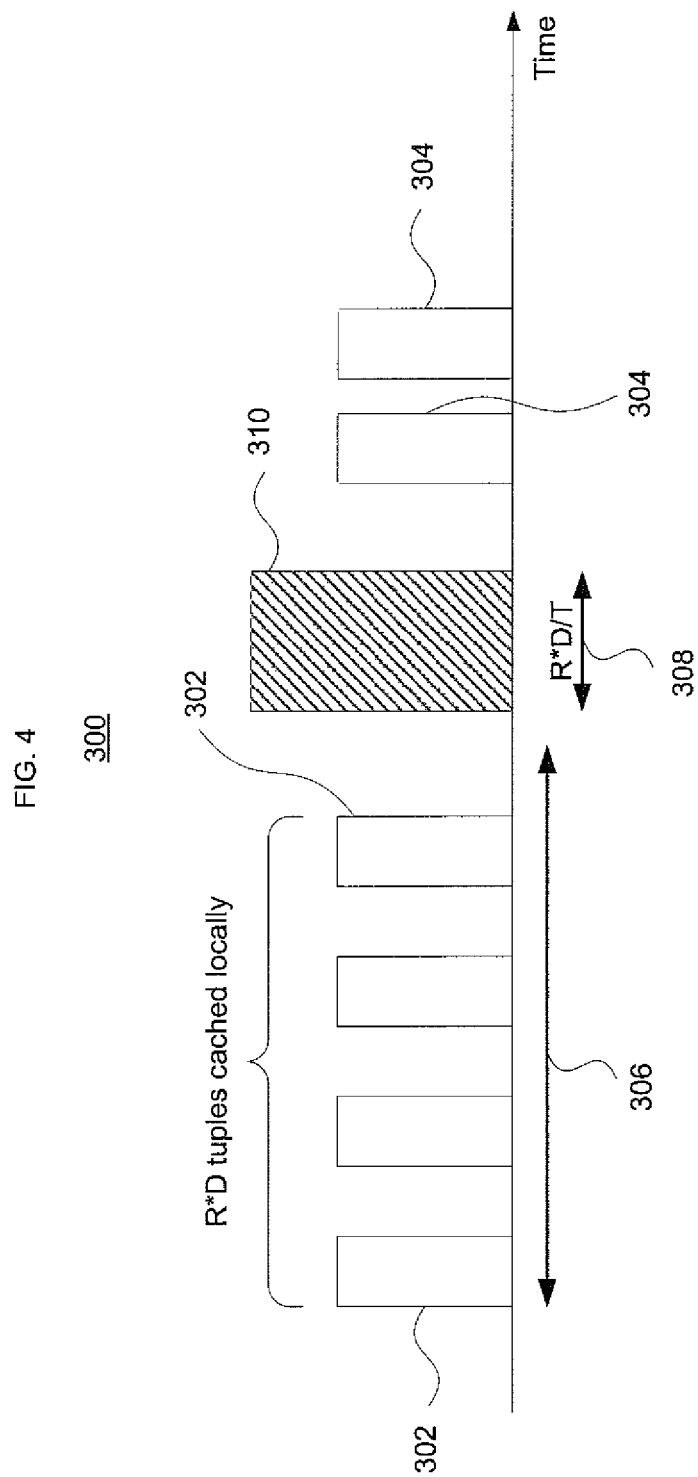
FIG. 4 illustrates a method of performing transmission chunking for energy efficiency.

FIG. 4 illustrates a method of performing transmission chunking for energy efficiency. It is known that the energy efficiency (defined as the energy per bit of transferred data) for a variety of communication technologies (such as Bluetooth, 802.15.4 and Zigbee) can be varied by effectively reducing the power consumption of the wireless interfaces during idle periods. In general, there is a tradeoff between the latency of communication and energy-efficiency. To observe this, assume that the sensor generates a periodic train of tuples as indicated by the rectangular icons 302 and 304. Instead of having the sensor transmit each tuple every 1/R seconds, in this embodiment the sensor's radio interface desirably remains in a low-power, non-transmitting mode 306 for a duration of D seconds.

Subsequently, the radio interface is activated and the entire set of R*D samples is transmitted in a very short burst 308 of data 310 in R*D/T seconds, where T is the instantaneous transmission rate of the wireless channel in tuples/sec (and T is typically>>R). By making D larger, one can improve the energy efficiency of data transfers for many different wireless technologies. Indeed, there are different power-saving techniques, such as PSM for 802.11 and SMAC or RMAC, that have been used for duty cycling to improve the energy efficiency of the transfer process. Moreover, it has been documented how a variety of such "chunked" transmission mechanisms can cause the energy consumption to be reduced by at least 50-60%. The penalty, however, lies in the form of increased latency. In particular, the maximum latency between the generation of an event and its transmission can be as large as D+(R/T). In other words, the process of "chunking" can cause as many as D*R tuples to be queued up at the sensor's transmitter during the "idle" power-efficient phase.

It is possible to have each individual data source (sensor) push the data in larger chunks (bigger D). However, the increased latency of transfers not only results in a corresponding delay in computing a stream analysis result (the result may only be computable D seconds after the actual generation of the event tuples) but also implies an additional processing burden on the event processing engine of the client device to accommodate the asynchronous, bursty nature of event arrivals from different sensors. The event processing engine would incur a higher computational and memory cost, as various intermediate states (corresponding to different time instants) must be stored for longer durations, until all the relevant data tuples from various streams have been received.

As a simple example, for a windowed join operation with a "join window" of T and involving two streams with arrival latencies of $D_1$ and $D_2$ and event generate rates of R the join operator must maintain a cache of $(D_1+T)*R+(D_2+T)*R$. Moreover, the join operation itself cannot be performed purely in a one-sided fashion and will incur significantly higher computational overhead, as each incoming tuple must now be also compared with cached tuples on the other stream. One important issue is applying appropriate bounds to the chunk-size to ensure that computational overheads (on the resource constrained mobile platform) do not become prohibitively large.

According to one aspect of the invention, an adaptive stream architecture employs an event processing engine to dynamically alter the order in which it acquires data from the individual sensor streams, so as to achieve a good combination of energy efficient data transfer between the data sources and the event processing platform and adherence to the computational resource constraints on the event processing engine. A sensor denotes the source of a data stream. In this respect, an event engine may be considered to be a sensor for a higher order event engine that may reside, for example, at a base station. Note that this aspect of the invention can be used recursively; namely, the output events generated by the event engine on the pervasive device may be viewed as input event streams to an event engine resident in an infrastructure server, and the same process of altering the event acquisition schedule could be applied between this server and a set of mobile devices. As an example, consider two sensors $S_1$ and $S_2$. Let $E_i^t$ denote the tuple at time t units corresponding to the data stream from sensor i. Let the query processing engine be required to generate an "alert" (which represents the type of output event generated as a result of the processing of the incoming sensor data) at time t if $MAX(E_1^t, E_2^t) > 100$.

In one example, the application is assumed to tolerate a notification delay of D=200 time units. If, statistically, $E_1^t$ has a 2% chance of exceeding 100, while $E_2^t$ has only a 0.5% chance of exceeding 100, then energy efficient event correlation may be achieved by first retrieving data (in chunks of 199 seconds) from sensor $S_1$. In this example, assume that in this chunk $\{E_1^1, E_1^2, \ldots, E_1^{199}\}$, the tuples $\{E_1^1, E_1^3$ and $E_1^{100}, E_1^{199}\}$ are seen to have a value greater than 100. In this case, the corresponding tuples from $S_2$ are redundant as the query predicate has already been satisfied. Hence, an efficient way of implementing the query processing logic is to then signal the sensor $S_2$ and pull from it a chunk of values $\{E_2^2, E_2^4, E_2^{99}, E_2^{101}, \ldots, E_2^{198}\}$; in other words, a chunk of tuples excluding the ones that are redundant from the analytic standpoint.

The above example can be easily extended to consider more than two sensors and significantly more complex stream processing logic. It is desirable to enable a stream processing system that achieves energy-efficient operation by intelligently selecting the order in which it evaluates the predicates associated with different sensor streams and combines this order selection with appropriate adaptation of the process of acquiring multiple data elements from each stream, which enables efficient asynchronous evaluation of long-standing continuous queries. Note that the "best order" of selecting streams (and groups of elements for each stream) may be dependent not just on the statistical properties of each stream's data, but also on the potentially differing acquisition cost associated with each stream, which can itself be a function of factors such as the power consumption characteristic of the network interface used and the size of the chunks in which data is acquired from each stream source.

Figure 5:
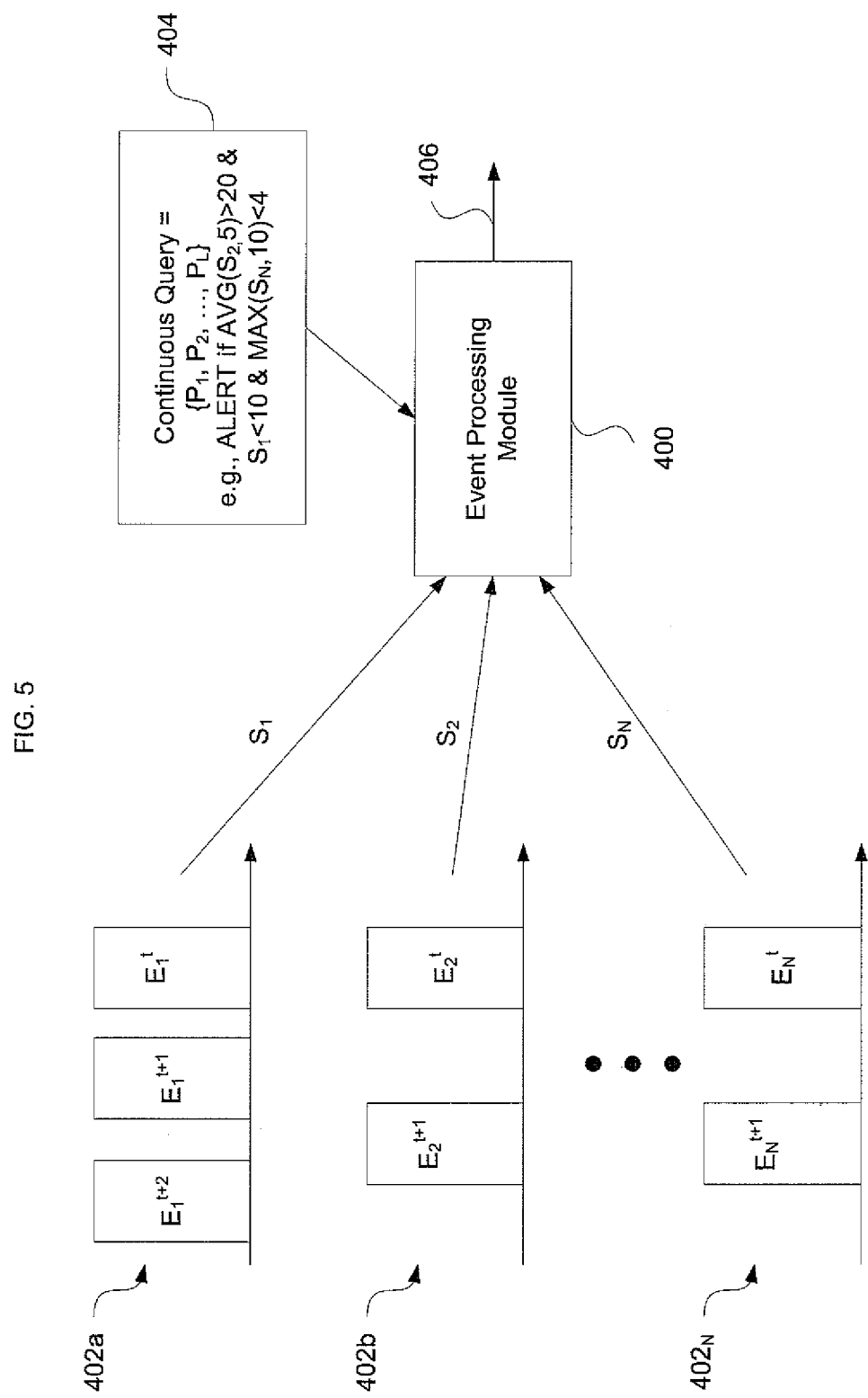
FIG. 5 illustrates event processing in accordance with aspects of the invention.

FIG. 5 illustrates event processing according to additional aspects of the invention. In this figure, event processing module 400 receives data from a set of data streams $S_1, S_2, \ldots, S_N$. The streams are transmitted by respective sensors (not shown), and each stream may be conceptually modeled as a "virtual queue." In particular, stream $S_1$ is associated with virtual queue 402a, stream $S_2$ with virtual queue 402b and stream $S_N$ with virtual queue 402$_N$.

Each virtual queue witnesses the arrival of a sequence of tuples (data elements) associated with that stream. Each such virtual queue (or individual element) is associated with an acquisition cost, represented by $AQ_i$, where i indexes the stream. Desirably, this cost is a function of the size and rate of the data generated by that stream source, but is also a function of the chunk size in which the data is acquired by the event processing engine.

A submitted continuous query 404 can then be viewed as a set of L predicates $\{P_1, P_2, \ldots, P_L\}$, where each predicate refers to one or more of the N virtual queues (streams). The event processing module 400 is configured to use both the statistics of the underlying streams and the acquisition costs $(AQ_1, \ldots, AQ_N)$ to determine an efficient order in which each stream will be acquired and then apply the appropriate predicate logic (e.g., using intermediate states) to deal with the asynchronous nature of such evaluations). The event processing module desirably outputs a high-layer derived event order 406 as a result of the application of the query predicates on the stream elements from the N virtual queues.

In one example, the continuous query may indicate an alert if the average value of $S_2$ (over 5 samples) is greater than 20, the value of $S_1$ is less than 10 and the maximum value for $S_N$ is less that 4 (over 5 samples). Here, the event processing module 404 may choose between $S_1$, $S_2$ and $S_N$ as follows. For $S_2$, there may be a 0.95 probability of a 5-sample average having a value less than 20. The cost for the 5-sample average may be 0.02 nanoJoules (nJ) per sample. And for $S_1$, there may be a 0.5 probability of $S_1(t)$ having a value less than 10 with a cost of 0.2 nJ/sample. Finally, for sensor $S_N$, there may be a 0.2 probability of the 10-sample average being less than 4, with a cost of 0.01 nJ/sample.

The acquisition process may involve the simultaneous retrieval of more than one element. As shown in FIG. 5, the event processing module 400 uses a dynamically varying order in which it acquires streams from multiple sensors and processes them. For the example above, where the predicate is conjunctive (a collection of logical ANDs), a desirable strategy would be to evaluate the predicate that is most likely to be FALSE (as such an evaluation implies that the overall query is FALSE) but also have low acquisition cost. In this case, the event processing module 404 will generate an output "Alert" element only if all three predicates "$AVG(S_2,5)>20$", "$S_1<10$" and "$MAX(S_N, 10)<4$" turn out to be TRUE.

Now, the probability of "$AVG(S_N,5)>20$" is FALSE=0.95, while the total acquisition cost=0.02*5=0.1 nJ. In effect, one can compute a 'normalized acquisition cost' as 0.1/0.95=1/9.5. In a similar manner, the normalized acquisition cost for "$S_1<10$" being FALSE equals (0.2/0.5=) 0.4 and for "MAX $(S_N,10)<4$" being FALSE equals $((10*0.01/0.8)=\frac{1}{8}$. Thus, in this simple example, the most efficient order of evaluation may be to first acquire and evaluate the predicate corresponding to sensor $S_2$, followed by sensor $S_N$, followed by sensor $S_1$. Now, consider the case where continuous query is disjunctive rather than conjunctive; in other words the query Q1="ALERT IF $AVG(S_2,5)>20$ OR $S_1<10\|(MAX(S_N, 10)<4$". In this case, a beneficial strategy is to evaluate predicates that have a higher probability of being TRUE (as this would terminate the overall query evaluation). Here, the 'normalized acquisition cost' would be (0.1/0.05=) 2 for $S_2$, (0.2/0.5=) 0.4 for $S_1$ and (0.1/0.2=) 0.5 for sensor $S_N$. Accordingly, the most efficient order of evaluation turns out to be the sequence $S_1$, $S_N$ and $S_2$. The above example illustrates both how the preferred order of data acquisition and evaluation would depend on both the statistical properties of the data stream elements and on the nature of the query predicates.

Importantly, continuous query logic may not only involve the application of a set of predicates to concurrent elements from different streams (e.g., detecting the simultaneous event that that the value of sensor $S_1>100$ and that of $S_2<50$), but may also involve temporal operators that require multiple elements from a single stream (e.g., detecting the event that $AVG_5(S_1)>100$ and $AVG_5(S_2)<100$, where $AVG_5$ indicates a sliding window operator that computes the average value of the stream tuples that occurred within the past 5 seconds). In this case, the requirement for averaging would require the event processing module 400 to acquire and process an entire 5-second window of data from either stream $S_1$ or $S_2$, and the choice of the better predicate (to evaluate first) may not only depend on the relative acquisition costs, but also on what data tuples may be already available in the local store of the event processing module 400. For example, 4 out of the 5 readings for $S_2$ may already have been retrieved for evaluating the predicate at the previous second.

Another important aspect of the invention is the ability to dynamically compute the acquisition cost $AQ_t$ based on such evolving operational states, and to use such dynamically computed costs to alter the order in which different predicates (and streams) are evaluated. Another aspect of the invention, related to the long running nature of the queries, incorporates changes in the statistical distribution of the underlying stream tuples due to changes in the external context. For example, stream elements from a heart rate sensor $S_x$ may have only a 20% likelihood of satisfying the predicate ($S_x>100$) when the user is resting or walking, but may have an 80% likelihood of satisfying the same predicate when the user is exercising in the gym. Given that the state of the art in mobile computing and smart phone capabilities allows such pervasive devices to intelligently infer a variety of rich external context, aspects of the invention accommodate the possibility of the system inferring the time varying, context-dependent changes in the statistical properties of the stream tuples and utilizing such changes to dynamically modify the sequence of sensor data acquisition and predicate evaluation.

In a further aspect of the invention, the system may incorporate virtual stream buffer size considerations and query latency in the analysis when choosing an acceptable chunk size. For example, the event processing module 400 may choose between getting stream S2 in units of 30 seconds with a cost of 0.015 nJ/sample or in units of 60 seconds with a cost of 0.01 nJ/sample. This may be done in view of a requirement for an alert in 40 seconds and available memory in the pervasive device (the sensor) of 2 MB. In this case, because a value of D=60 seconds could lead to a worst-case latency of alert generation to become 60 seconds, the system would opt to get stream S2 in units of 30 seconds (even though the per-element cost of acquisition with D=60 seconds is 33% lower than the corresponding cost with D=30 seconds).

And in a further aspect of the invention, the system desirably employs a dynamic model of acquisition cost that changes based on factors such as residual sensor energy and rate of sensor stream generation (e.g., context-dependent) considerations and query latency in choosing an acceptable chunk size. For instance, when choosing between streams $S_1$ and $S_2$, the system may evaluate the following factors. Assume, as in the numerical example used before, S2 has 125 nJ remaining, a probability of "5-sample averages being less than 20" equaling 0.95, and a cost for the 5-sample averages being 0.02 nJ/sample. Likewise, S1 may have 500 nJ of residual battery energy, a probability that S1(t)<10 is 0.5, a cost (S1) of 0.2 nJ/sample. For simplicity, the consideration of $S_N$ is omitted from this discussion, although the extension is straightforward.

Now, for the query "ALERT if AVG(S2,5)>20 AND S1<10", can be seen that the more effective evaluation sequence would be to acquire data from S2 first, followed by S1. However, in this approach, for each instance of the evaluation, S2's energy is reduced by 0.1 nJ, implying that the evaluation can last for a maximum of 125/0.1=1250 different time instants. Since, in this sequence, S1 is evaluated only if the predicate "AVG(S2,5)>20" (which occurs only 5% of the time), S1 is likely to have a residual energy of (500−0.05*0.2*1250=) 487.5 nJ. From the perspective of operational lifetime, an approach that instead evaluates S1 first turns to be more effective. In particular, if S1 is evaluated first, the evaluation can last for a maximum of (500/0.2=) 2500 different time instants. Within this time, since S2 will be evaluated with only 0.5 probability, its expected energy consumption will be 0.5*0.1*2500=125 nJ, implying a residual energy of 0 at the end of 2500 evaluation instants. The above example illustrates how the system can dynamically alter the evaluation sequence to address additional objectives, such as maximizing the operational lifetime, besides simply minimizing the acquisition and evaluation cost.

Figure 6:
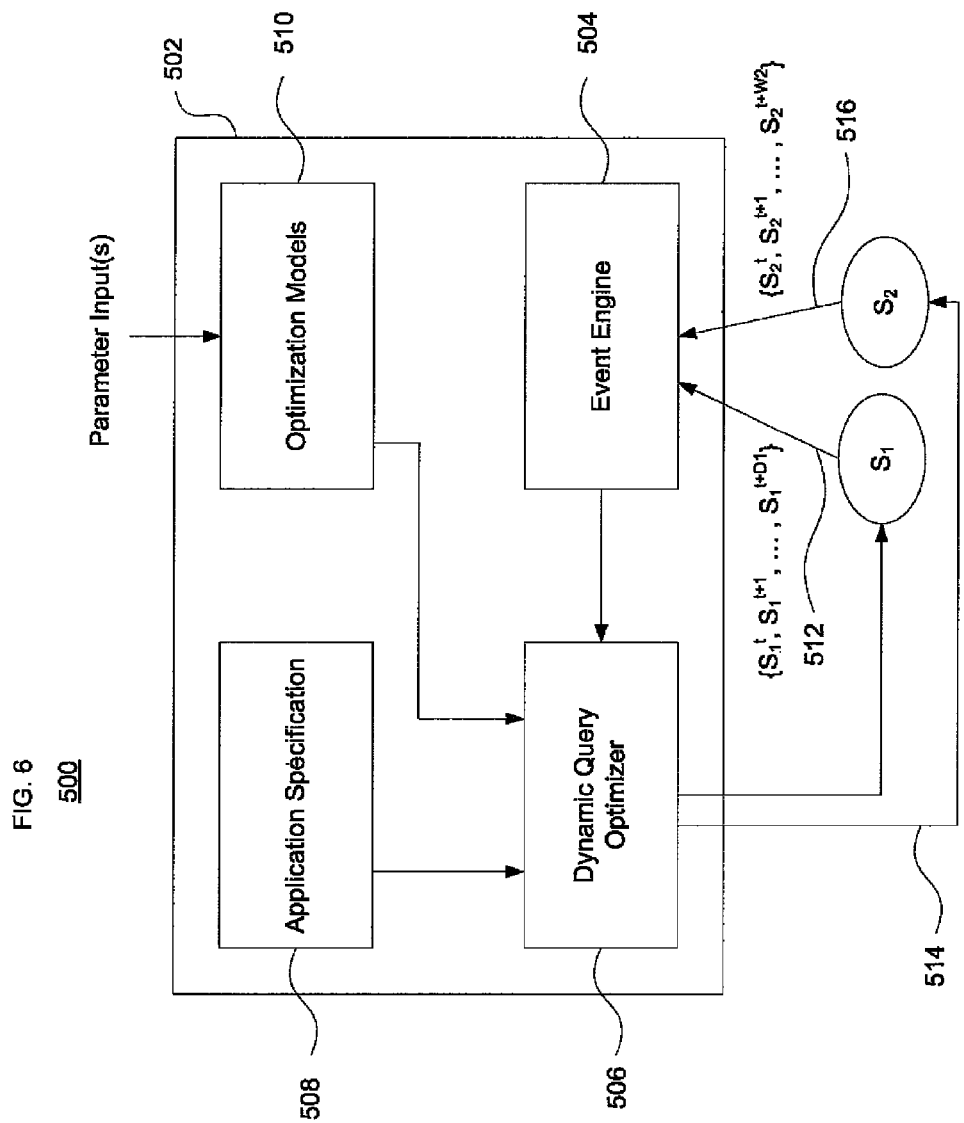
FIG. 6 is a block diagram illustrating a stream analytic platform for managing sensor data streams according to aspects of the invention.

FIG. 6 illustrates a functional architecture 500 in accordance with aspects of the invention. A stream analytic platform 502 embodying the event processing module 400 is configured to operate on data streams $S_1$ and $S_2$ from at least two sensors 202 (see FIG. 3). The data streams $S_1$ and $S_2$ correspond to two virtual queues, $VQ_1$ and $VQ_2$, respectively. Platform 502 desirably includes event engine 504, dynamic query optimizer 506, application specification 508 and optimization models 510.

The event engine 504 applies the various event operator graphs, which are representations of the query predicates, to the data tuples from different streams that it receives. The operator graphs are generated by the event engine based on the query, which may be specified in a variety of formats (e.g., using the standard SQL syntax). The dynamic query optimizer 506 is configured to compute the best (optimal) order in which the tuples from the two different sensor streams should be retrieved for evaluation by the event engine 504, and the number and specific indices of the tuples that should be retrieved, e.g., for asynchronous evaluation of long-running queries. The application specification 508 specifies key characteristics of the application, including its operator logic and how much latency it can tolerate in obtaining its answers, which determine the maximum duration of asynchronous acquisition that is permissible. The set of optimization models 510 capture and compute the various parameters used by the dynamic query optimizer module 506. Such parameters may include energy models for the transmitters/radios of the different sensors and how their power consumption varies with different values of D (the idle low power duration), the statistical probabilities of how relevant the data from different sensors are likely to be for the query predicates, and the external context state, which may affect the statistical properties of the data tuples.

Desirably, the system operates by having the dynamic query optimizer 506 receive as inputs constraints from the application specification 508 and parameters from the optimization models 510. The system may then apply appropriate optimization logic to compute both the order and the size of the chunk in which the elements of each virtual queue should be provided to the event engine 504. Depending on the actual values sampled and the resultant change to the output state of the queries, the dynamic query optimizer 506 may subsequently dynamically modify this order for the remaining sensor streams. To apply such dynamic order modification, the dynamic query optimizer 506 may receive appropriate intermediate (or final) states of the result of the query processing logic applied in the event engine 504.

For ease of exposition, in this example the sensors produce a tuple every second; hence a chunk size of D translates into an idle period of D as well. In one alternative, the dynamic query optimizer 506 first selects $S_1$ (with a value of $D_1=10$)

and thus retrieves 10 seconds worth of data from a first sensor (as shown by arrow 512). The event engine uses these arriving values to determine the set of additional data tuples that it potentially needs to pull from the other sensors.

In this illustration, the dynamic query optimizer 506 will then request (as shown by arrow 514) that the second sensor send values, corresponding to a chunk size of D2, of a set of tuples needed by the event engine 504 in order to compute the result. Upon receiving these tuples (as shown by arrow 516) the event engine 504 can complete an analytical computation for different time instants. While not expressly illustrated in this embodiment, various other forms of chunked transmission (e.g., the event engine requesting all the data for a specific time window from stream $S_2$ of the second sensor or the dynamic query optimizer signaling the first sensor to transmit only data samples that satisfy a condition (e.g., exceed 100)) are permitted and incorporated here in their entirety. Moreover, an event processing system can complement this proposed technique with alternative techniques for improving energy efficiency, such as the use of MAC layer scheduling to eliminate contention among multiple sensor data sources transferring data or the use of threshold-based approaches to eliminate the transmission of samples that do not deviate significantly from their previous values.

One exemplary process to determine the order of data acquisition and the amount of data to be acquired can be computed for different sensor streams by the dynamic query optimizer is shown in the flow diagram 600 of FIG. 7, which identifies various computing costs. It is possible to model the unconditional probability that an event $E_i^t$ (corresponding the sensor sample from a sensor $S_i$ at time t) is relevant to a particular query processing operator as $p(E_i^t)$.

The joint selection of the order in which sensors are queried, as well as the chunk size (or $D_i$ values) for the sensors, can then be framed as a generic optimization problem of minimizing the total weighted cost where the cost of retrieval of a particular chunk of data from a sensor is weighed by the likelihood of individual tuples in that chunk proving to be relevant to one or more queries running in the query engine. For example, assume that $p(E_i^t)$ is identical for different times and can thus be represented by $p_i$.

As shown in block 602, an energy-cost function $f_i(D_i)$ is obtained which represents the total transmission energy consumed by sensor $S_i$ if its tuples are transmitted proactively in chunks of $D_i$ tuples (with $D_i$ being an optimization variable that varies between 1, 2, ..., $D_{max}$, where $D_{max}$ is bounded by the maximum acceptable latency in output generation acceptable to the query.). In general, $f_i(D_i)$ can be assumed to be an increasing, but concave, function of $D_i$. Then, in one embodiment, the optimal choice $D_i^*$ for each sensor $S_i$ is determined by finding the value of $D_i$ that minimizes the normalized (or unit tuple) energy cost, given by $D_i^*$=arg min $f_i(D_i)/D_i$ (block 604).

Then as shown in block 606, the total weighted cost "COST (i)" of having sensor $S_i$ proactively transmit its data in chunks of $D_i$ units is computed by the equation COST(i)=$f_i(D_i^*)/p_i$. Desirably, the weighted cost is chosen such that it is a decreasing function of $p_i$, indicating a lower acquisition cost if relevancy likelihood $p_i$ is high. Given this, the sensor streams may be sorted in ascending order of the total weighted cost $f_i(D_i^*)/p_i$ as shown in block 608.

The system initiates a procedure of retrieving the appropriate chunks from the sensors, starting with the stream with the lowest total weighted cost from which data is yet to be acquired, as shown in block 610. After the lowest-cost stream is retrieved, e.g., by having the dynamic query optimizer signal the corresponding stream source, the data is used by the event engine to refine the result of the query being processed, as shown in block 612.

At block 614, it is determined whether the query has been satisfactorily resolved (either fully or partially) as a result of this set of input stream tuples (e.g., if for specific time instances, the result of the evaluation will not be affected by data from the other streams or virtual queues). If the query is fully resolved, the process is then terminated in block 616, thereby avoiding the need to acquire or process the data tuples from the other streams. However, if the query resolution requires additional data (e.g., is partially resolved), the process of selecting the next input stream is repeated by returning to block 606. This may potentially involving recomputing the COST( ) function for the remaining streams based on updates to the conditional statistics of the elements of these streams.

These actions can be generalized to use many variants of this process. For example, a pre-specified threshold Th may be defined and all streams with total weighted cost lower than Th may be set to proactively "push" their data to the event engine. This alternative trades computational complexity for slightly inferior performance by always consuming data from those set of streams that have an appropriately low data acquisition cost, even if subsets of the arriving data tuples may not be always needed for computing the query result).

In another alternative, instead of iteratively recomputing the total weighted cost after the utilization of data from a specific stream, the process may pre-compute an "unconditional" set of total weighted costs and use these costs to define an unconditional sequence in which the data from different streams is acquired and used by the event engine. All such variants of the basic dynamic reordering process may be employed with the embodiments of the invention.

Using the procedures discussed above, a client device such as a mobile phone communicates with remote sensors to manage and collect data streams from the sensors. By setting the order of the streams, when to buffer data and for how long, and the stream (packet) size, the client device enables the sensors to conserve power, thereby extending the useful lifetime of the sensors.

Although aspects of the invention herein have been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the invention as defined by the appended claims.

While certain processes and operations have been shown in certain orders, it should be understood that they may be performed in different orders and/or in parallel with other operations unless expressly stated to the contrary.

The invention claimed is:

1. An apparatus for managing data streams from sensor devices received by a mobile client device, the apparatus comprising:
    a memory configured to store received data from the sensor devices; and
    a processor configured to:
    identify a plurality of data streams each corresponding to a respective sensor device, each of the plurality of data streams being receivable by the mobile client device;
    specify an order for which each of the plurality of data streams is to be processed by an event processing module of the client device;

receive at least one of the plurality of data streams in the specified order;

determine at least a partial result of a query predicate using data from the received at least one of the plurality of data streams; and if the query predicate is partially resolved, then dynamically modify some property of a process by which a remaining selected set of the plurality of data streams and data are retrieved by the event proceeding module.

2. The apparatus of claim 1, wherein the dynamic modification includes dynamically modifying the order for acquiring or processing data from selected ones of the remaining selected set of data streams based upon the partial result of the query predicate.

3. The apparatus of claim 1, wherein the dynamic modification includes dynamically modifying a given property of the remaining selected set of sensors.

4. The apparatus of claim 1, wherein the processor comprises an event processing module including:

an event engine configured to apply event operator graphs to data tuples of the plurality of received data streams; and a dynamic query optimizer configured to compute an optimal order in which the data tuples from the plurality of sensor streams should be retrieved for evaluation by the event engine.

5. The apparatus of claim 4, wherein the event processing module further includes an application specification that specifies characteristics of an application, including operator logic and latency toleration.

6. The apparatus of claim 4, wherein the event processing module further includes a set of optimization models used to capture and compute parameters for evaluation by the dynamic query optimizer.

7. The apparatus of claim 4, wherein the dynamic query optimizer is configured to instruct at least one of the sensor devices to delay transmission of its data stream.

8. The apparatus of claim 4, wherein the dynamic query optimizer is configured to:

associate each of the plurality of data streams with a corresponding acquisition cost; and set an acquisition order for controlling transmissions of the plurality of data streams based on the acquisition costs.

9. The apparatus of claim 8, wherein the acquisition cost for a given one of the plurality of data streams is a function of a size and rate of data generated by the sensor device configured to issue the given data stream.

10. The apparatus of claim 1, wherein the processor is further configured to track any changes to the statistical distribution of the values of the chosen ones of the plurality of data streams, and use the statistical distribution to modify the order of stream acquisition and evaluation.

11. The apparatus of claim 10, wherein the processor is further configured to use a determination of pre-specified contextual states to trigger the modification of the order of stream acquisition and evaluation.

12. The apparatus of claim 1, wherein the dynamic modification includes:

dynamically modifying an order in which the remaining selected set of the plurality of data streams are to be retrieved by the event proceeding module; and, dynamically modifying a number of data tuples in each of the remaining selected set of the plurality of data streams that are to be retrieved by the event processing module.

13. The apparatus of claim 1, wherein if the query predicate is fully resolved then do not perform the dynamic modification thereby avoiding a need to acquire or process data from any remaining data streams.

14. The apparatus of claim 1, wherein the processor is further configured to:

determine a total weighted cost for each of the sensor devices to proactively transmit its data in predetermined data chunks, where weighting for the total weight cost is associated with a likelihood of individual tuples in a given data chunk being relevant to the query predicate to be processed by the event processing module and a communication cost involved in acquiring a given data chunk;

sort the total weighted costs for the respective data streams; and, instruct the sensor devices to transmit their respective data streams according to the sorted total weight costs.

15. A client device for managing data streams from sensor devices, the client device comprising:

a processor comprising an event processing module configured to:

receive a query which is viewed as a set of query predicates, where each query predicate refers to one or more of the data streams from the sensor devices;

determine an order in which each data stream will be acquired using both statistics and acquisition costs of the data streams;

acquire at least one of the data streams;

apply the set of query predicates to data elements of the acquired at least one of the data streams; and, if the set of query predicates are partially resolved then dynamically modify some property of a process by which a remaining selected set of the plurality of data streams transmit their data by determining an order in which each data stream of the remaining selected set of data streams will be acquired using both statistics and the acquisition costs of the remaining selected set of data streams and then apply the set of query predicates to data elements of the acquired remaining selected set of data streams; and, if the set of query predicates is resolved, then output a derived event order as a result of applying the set of query predicates to the data elements of the acquired data streams.

16. The client device of claim 15, wherein the dynamic modification includes dynamically modifying a number of data tuples in each of the remaining selected set of the plurality of data streams.

17. A client device for managing data streams from sensor devices, the client device comprising:

a processor comprising an event processing module configured to:

obtain an energy-cost function which represents a total transmission energy consumed by the sensor devices if their data tuples are transmitted proactively in chunks of data tuples;

determine the chunk size for each sensor device utilizing the energy-cost function;

determine a total weighted cost for each sensor device to proactively transmit data in the chunk size;

sort the data streams from the sensor devices in ascending order of the total weighted cost for each sensor device;

initiate retrieval of the chunks from the sensor devices starting with the data stream with the lowest total weighted cost from which data is yet to be acquired;

upon retrieval of the data stream with the lowest total weighted cost, use the retrieved chunks to refine a result of a query being processed; and, if the query is not resolved as a result of the retrieved chunks, then return to the second determine operation to select another data stream to be processed per the query and perform the sort operation, the initiate operation and the use operation until the query is resolved.

18. The client device of claim 17, wherein if the query is not resolved as a result of the retrieved chunks, then return to the first determine operation and recomputed the chunk size for remaining sensor devices and then proceed to the second determine operation to select another data stream to be processed per the query and perform the sort operation, the initiate operation and the use operation until the query is resolved.

* * * * *

UNITED STATES PATENT AND TRADEMARK OFFICE
CERTIFICATE OF CORRECTION

PATENT NO. : 9,137,282 B2  
APPLICATION NO. : 14/081308  
DATED : September 15, 2015  
INVENTOR(S) : Misra et al.

Page 1 of 2

It is certified that error appears in the above-identified patent and that said Letters Patent is hereby corrected as shown below:

On the Title Page, in Item (56), under "OTHER PUBLICATIONS", in Column 2, Line 2, delete "Toronota," and insert -- Toronto, --, therefor.

On the Title Page, in the Figure, delete " $f_i(D_i)$ " and insert -- $f_i(D_i)$ --, therefor.

On Page 2, in Item (56), under "OTHER PUBLICATIONS", in Column 2, Line 1, delete "Jovanov, F," and insert -- Jovanov, E., --, therefor.

On Page 2, in Item (56), under "OTHER PUBLICATIONS", in Column 2, Line 7, delete "Toronota," and insert -- Toronto, --, therefor.

IN THE DRAWINGS

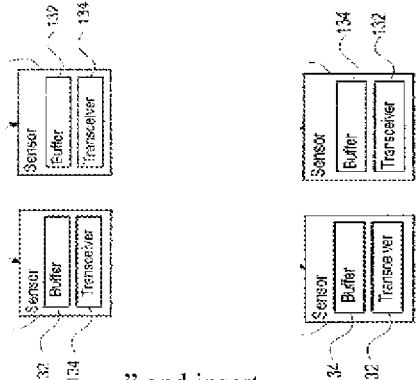

In Fig. 3, Sheet 3 of 7, delete " " and insert -- --, therefor.

In Fig. 7, Sheet 7 of 7, delete " $f_i(D_i)$ " and insert -- $f_i(D_i)$ --, therefor.

Signed and Sealed this  
Fifteenth Day of March, 2016

Michelle K. Lee  
*Director of the United States Patent and Trademark Office*

CERTIFICATE OF CORRECTION (continued)
U.S. Pat. No. 9,137,282 B2

IN THE SPECIFICATION

In Column 1, Lines 14-17, delete "This................597." and insert the same at Line 5, below Title, as a new paragraph.

In Column 7, Line 42, delete "Server 102" and insert -- Server 104 --, therefor.

In Column 10, Lines 19-20, delete "event processing module 404" and insert -- event processing module 400 --, therefor.

In Column 10, Line 37, delete "event processing module 404" and insert -- event processing module 400 --, therefor.

In Column 10, Line 58, delete "$S_1$, $S_N$ and $S_2$." and insert -- $S_1$, $S_2$ and $S_N$. --, therefor.

In Column 10, Line 65, delete "that that the" and insert -- that the --, therefor.

In Column 11, Line 58, delete "0.5, a" and insert -- 0.5, at --, therefor.

In Column 11, Line 63, delete "S1<10", can" and insert -- S1<10", it can --, therefor.

IN THE CLAIMS

In Column 15, Line 9, in Claim 1, delete "and data" and insert -- and their data --, therefor.